US007758211B2

(12) United States Patent
Zheng et al.

(10) Patent No.: US 7,758,211 B2

(45) Date of Patent: Jul. 20, 2010

(54) LED LAMP

(75) Inventors: Shi-Song Zheng, Shenzhen (CN); Zhong-Qing Wang, Shenzhen (CN); Yi-San Liu, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 230 days.

(21) Appl. No.: 12/141,889

(22) Filed: Jun. 18, 2008

(65) Prior Publication Data

US 2009/0268477 A1 Oct. 29, 2009

(30) Foreign Application Priority Data

Apr. 25, 2008 (CN) ........................ 2008 1 0066685

(51) Int. Cl.

*F21S 4/00* (2006.01)
*F21V 21/00* (2006.01)
*B60Q 1/00* (2006.01)

(52) U.S. Cl. ................... 362/249.02; 362/373; 362/800

(58) Field of Classification Search ................. 362/240, 362/241, 249.01, 249.02, 294, 373, 431

See application file for complete search history.

(56) References Cited

U.S. PATENT DOCUMENTS

| | | | | |
|---|---|---|---|---|
| 6,431,728 | B1 * | 8/2002 | Fredericks et al. | 362/244 |
| 2008/0062689 | A1 * | 3/2008 | Villard | 362/250 |
| 2009/0168418 | A1 * | 7/2009 | Zheng et al. | 362/234 |

* cited by examiner

*Primary Examiner*—Jong-Suk (James) Lee
*Assistant Examiner*—David R Crowe
(74) *Attorney, Agent, or Firm*—Frank R. Niranjan

(57) ABSTRACT

An LED lamp includes a bracket, a heat sink mounted on a top side of the bracket, and a plurality of LED modules mounted on the heat sink. The heat sink includes a base and a plurality of mounting members extending downwardly from a bottom surface of the base. Each of the mounting members includes an extending plate formed on the bottom surface of the base and a mounting plate extending slantwise upwardly and outwardly at a bottom end of the extending plate. The LED modules are mounted on bottom surfaces of the mounting plates of the mounting members of the heat sink, respectively. The extending plates have gradually decreased lengths from two central ones thereof toward lateral ones thereof. The mounting plates and the bottom surface of the base form acute angles which are gradually decreased from a center of the base to lateral sides of the base.

11 Claims, 4 Drawing Sheets

LED LAMP

BACKGROUND OF THE INVENTION

1. Field of the Invention

The present invention relates to an LED lamp, more particularly to an LED lamp used as a street lamp and having a large illumination angle.

2. Description of related art

The technology of light emitting diodes has rapidly developed in recent years from indicators to illumination applications. With the features of long-term reliability, environment friendliness and low power consumption, the LED is viewed as a promising alternative for future lighting products.

A conventional LED lamp comprises a heat sink and a plurality of LED modules having LEDs attached to an outer surface of a heat sink to dissipate heat generated by the LEDs. The outer surface of the heat sink generally is a plane and the LEDs are arranged close to each other. When the LED lamp works, the LEDs mounted on the planar outer surface of the heat sink only form a plane light source.

What is needed, therefore, is an LED lamp having a large illumination angle to thereby function as a three-dimensional light source.

SUMMARY OF THE INVENTION

An LED lamp includes a bracket, a heat sink mounted on a top side of the bracket, and a plurality of LED modules mounted on the heat sink. The heat sink includes a base and a plurality of mounting members extending downwardly from a bottom surface of the base. Each of the mounting members includes an extending plate formed on the bottom surface of the base and a mounting plate extending slantwise upwardly and outwardly at a bottom end of the extending plate. The LED modules are mounted on bottom surfaces of the mounting plates of the mounting members of the heat sink, respectively. The mounting plates and the bottom surface of the base form acute angles which are gradually decreased from a center of the base to lateral sides of the base.

Other advantages and novel features will become more apparent from the following detailed description of preferred embodiments when taken in conjunction with the accompanying drawings, in which:

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE INVENTION

Figure 1:
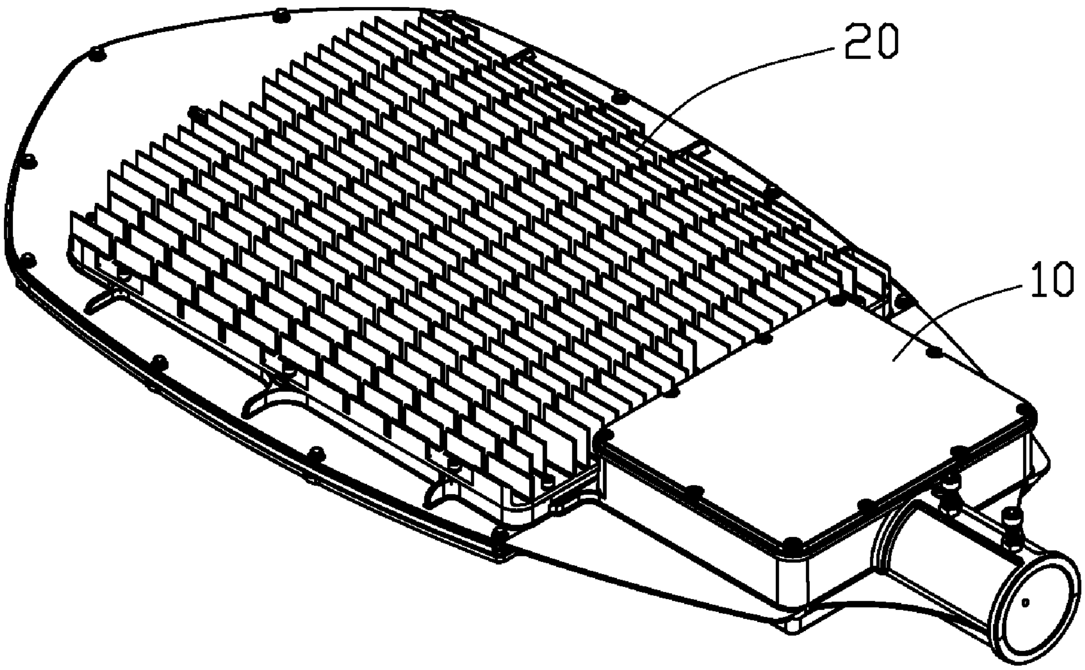
FIG. 1 is an assembled view of an LED lamp assembly in accordance with a preferred embodiment of the present invention.
Figure 2:
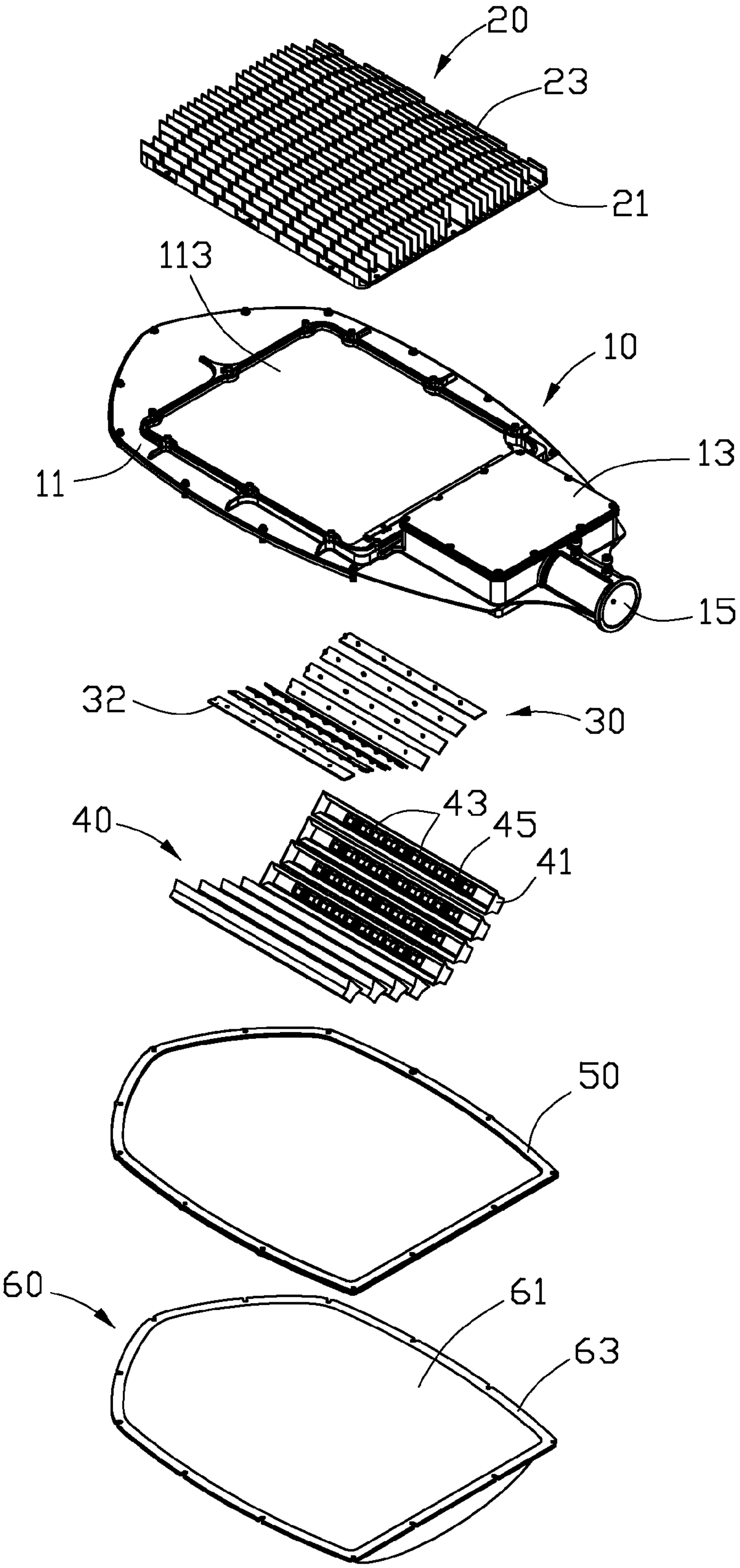
FIG. 2 is an exploded view of FIG. 1.

Referring to FIGS. 1-2, an LED lamp comprises a bracket 10, a heat sink 20 mounted on a top side of the bracket 10, a plurality of LED modules 30 mounted on a bottom of the heat sink 20, a plurality of reflectors 40 covering the LED modules 30, and a transparent envelope 60 mounted on a bottom side of the bracket 10 opposite to the heat sink 20.

Figure 3:
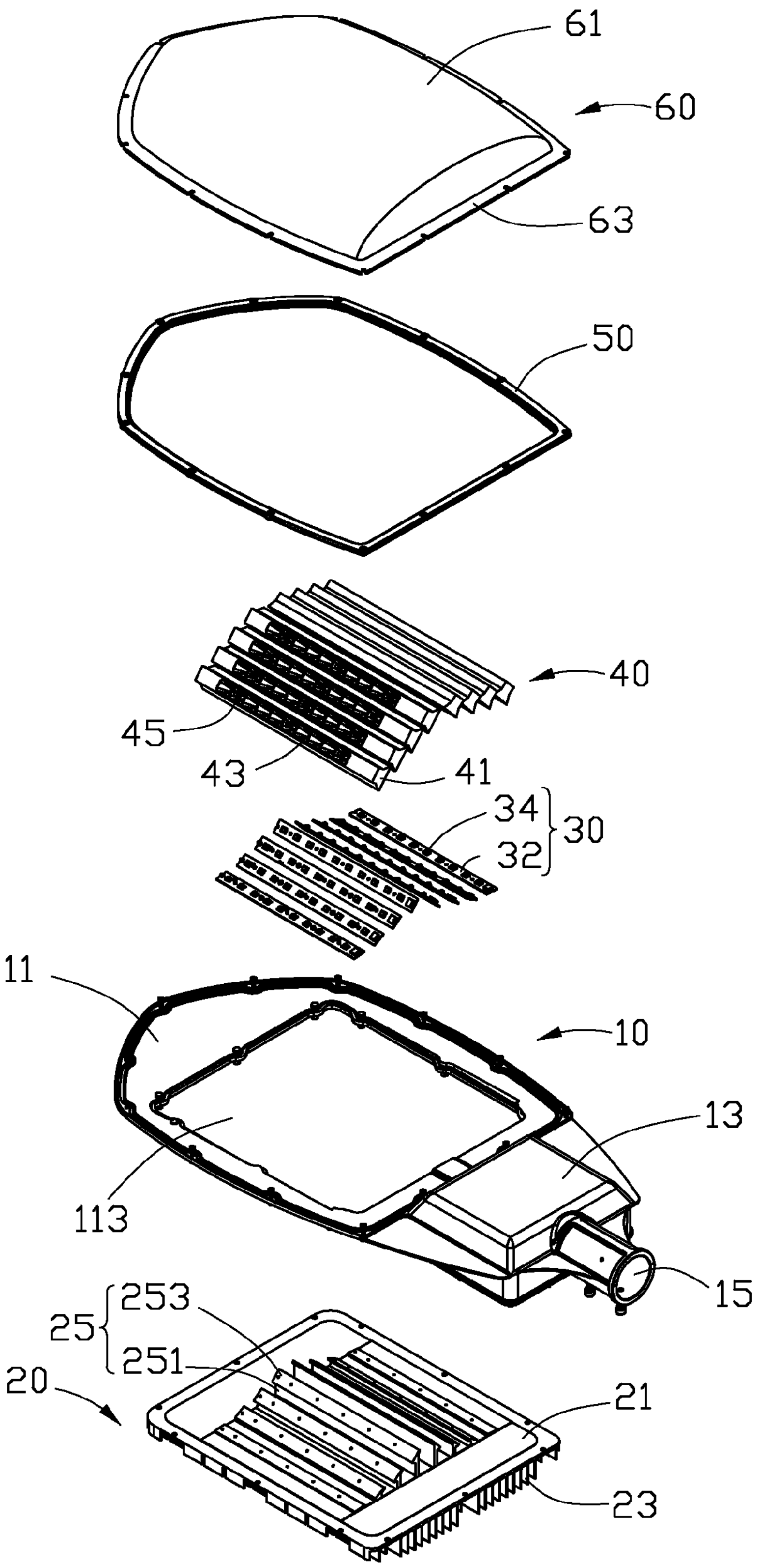
FIG. 3 is an inverted view of FIG. 2.

Referring to FIG. 3 also, the bracket 10 comprises a frame 11 and a driving circuit module 13 located at a rear end of the frame 11 to electronically connect with the LED modules 30. The frame 11 has a substantially remiform configuration and defines a rectangular opening 113 at a centre therein. A plurality of arc-shaped flanges (not labeled) surrounds the opening 113. The heat sink 20, the frame 11 and the envelope 60 are assembled together to form a hermetical chamber (not labeled) to receive the LED modules 30 and the reflectors 40 in the chamber. A fixture 15 is located at a centre of an end of the bracket 10. The fixture 15 is used for connecting the LED lamp to a supporting structure, such as a supporting post (not shown) of a lamp stand (not shown).

Figure 4:
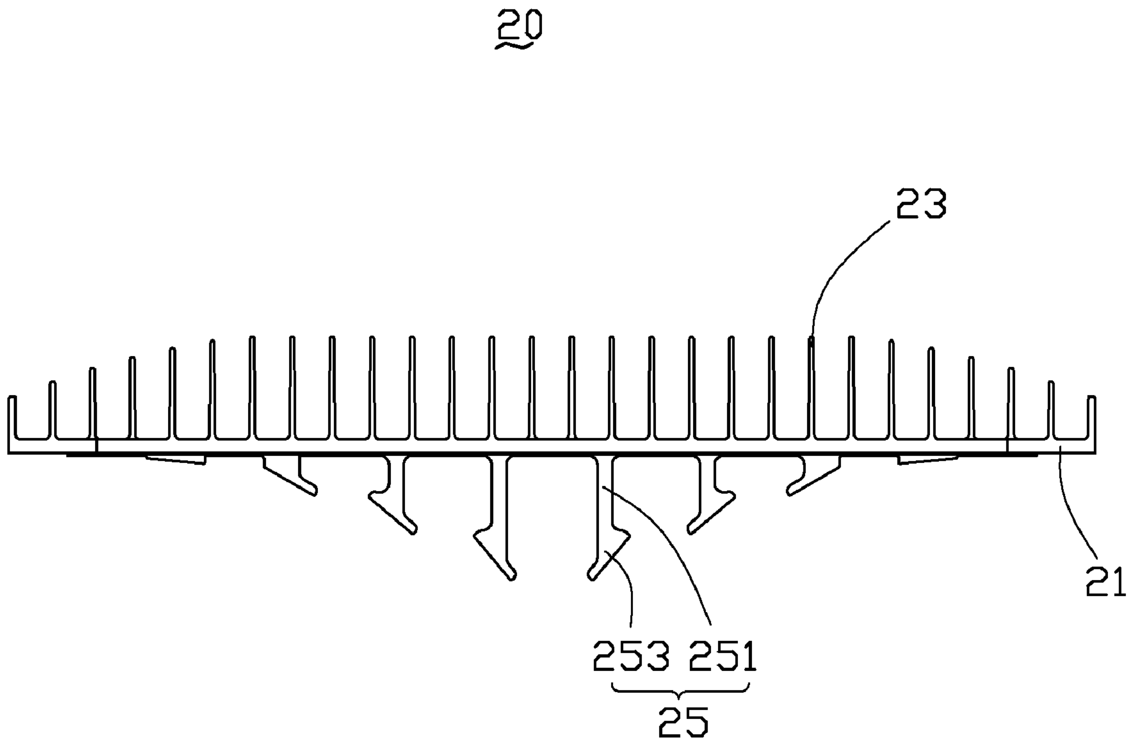
FIG. 4 is a front elevational view of a heat sink of the LED lamp assembly of FIG. 1.

Referring to FIG. 4 also, the heat sink 20 is made of a material with a high degree of heat conductivity, such as copper or aluminum. The heat sink 20 comprises a rectangular base 21. A plurality of fins 23 extends upwardly from a top surface of the base 21 and a plurality of mounting members 25 extends downwardly from a bottom surface of the base 21. The base 21 of the heat sink 20 is mounted on the frame 11 and covers the opening 113 of the frame 11. The mounting members 25 extend through the opening 113 of the frame 11.

The mounting members 25 are symmetrical about a central line (not shown) of the bottom surface of the base 21, which is longitudinally extended through a centre the bottom surface of the base 21. The mounting members 25 are spaced from each other. Each mounting member 25 comprises a rectangular extending plate 251 and a rectangular mounting plate 253. The LED modules 30 are mounted on the mounting plates 253, respectively.

The extending plates 251 extend downwardly from and perpendicularly to the bottom surface of the base 21. The extending plates 251 are spaced from and parallel to each other. Each of the extending plates 251 is distributed along a front-to-rear direction. Heights of the extending plates 251 are gradually decreased along directions from two central ones of the extending plates 251 toward lateral ones of the extending plates 251, which means that a pair of extending plates 251 located at the central portion of the base 21 has heights equal to each other and higher than other extending plates 251 beside the central extending plates 251.

Each mounting plate 253 extends slantwise upwardly and outwardly on an bottom end of the extending plate 251. Each mounting plate 253 is disposed at an acute angle with respect to the bottom surface of the base 21. The angles between the mounting plates 253 and the bottom surface of the base 21 are gradually decreased from two central ones of the mounting plates 253 toward lateral sides of the base 21, which means that a pair of the mounting plates 253 located at a center of the mounting plates 253 form acute angles with the bottom surface of the base 21 which are identical with each other and larger than the other angles between the other mounting plates 253 and the bottom surface of the base 21. Thus, the LED lamp has a larger illumination angle than the conventional LED lamp.

Each LED module 30 comprises an elongated printed circuit board 32 and a plurality of spaced LEDs 34 evenly mounted on a side of the printed circuit board 32 and facing toward the envelope 60. The LEDs 34 of each LED module 30 are arranged along a longitudinal direction of the printed circuit board 32. Each LED module 30 is mounted in a thermally conductive relationship with a corresponding mounting plate 253 of the mounting member 25 of the heat sink 20.

Each reflector 40 is located over the printed circuit board 32 of a corresponding LED module 30. The reflector 40 comprises a rim 41 and a plurality of ribs (not labeled) within the rim 41. The rim 41 and the ribs connect with each other to define a plurality of through holes 43. The LEDs 34 are received in the through holes 43, respectively. Light generated by the LEDs 34 is reflected by the reflectors 40 to increase the intensity of the light emitted from the LED lamp. A plurality of sleeves 45 is formed in the reflector 40 along a thickness direction of the reflector 40. A plurality of screws (not shown) are used to extend through the sleeves 45 and the printed circuit boards 32 of the LED modules 30 to engage with the heat sink 20 to thereby mount the reflectors 40 and the LED modules 30 on the heat sink 20.

The envelope 60 comprises a convex portion 61 and a plurality of mounting portions 63 extending outwardly from edges of the convex portion 61. A plurality of screws (not shown) extends through the mounting portions 63 and engages with the flanges of the frame 11 of the bracket 10 to mount the envelope 60 on the bracket 10. A gasket 50 is sandwiched between the mounting portions 63 of the envelope 60 and the flanges of the frame 11 of the bracket 10 to enhance hermeticity of the connection between the frame 11 and the envelope 60.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LED lamp comprising:

a bracket;

a heat sink mounted on a top side of the bracket, the heat sink comprising a base and a plurality of mounting members extending downwardly from a bottom surface of the base, each of the mounting members comprising an extending plate formed on the bottom surface of the base and a mounting plate extending slantwise upwardly and outwardly at a bottom end of the extending plate; and a plurality of LED modules mounted on bottom surfaces of the mounting plates of the mounting members of the heat sink, respectively;

wherein the mounting plates and the bottom surface of the base form acute angles which are gradually decreased from a center of the base to lateral sides of the base.

2. The LED lamp as claimed in claim 1, wherein the mounting plates are spaced from and angled with each other.

3. The LED lamp as claimed in claim 1, wherein the extending plates are perpendicular to the bottom surface of the base, spaced from and parallel to each other and extend along a longitudinal direction of the base.

4. The LED lamp as claimed in claim 3, wherein the extending plates are symmetrically distributed on the base about a central line of the base, which extends longitudinally through a centre of the base.

5. The LED lamp as claimed in claim 3, wherein a pair of the extending plates located at a central portion of the base has heights equal to each other and higher than other extending plates.

6. The LED lamp as claimed in claim 3, wherein heights of the extending plates gradually decrease from one of the extending plates which is located at a central portion of the base toward a lateral side of the base.

7. The LED lamp as claimed in claim 1, wherein a plurality of fins extends upwardly from a top surface of the base.

8. The LED lamp as claimed in claim 1, wherein the bracket comprises a frame and a driving circuit module located at a rear end of the frame, the heat sink mounted on a top side of the frame.

9. The LED lamp as claimed in claim 8, wherein the frame has a substantially remiform configuration and defines a rectangular opening at a centre thereof, the mounting members of the heat sink extending through the opening of the frame.

10. The LED lamp as claimed in claim 9, wherein a plurality of reflectors covers the LED modules.

11. The LED lamp as claimed in claim 9, wherein a transparent envelope is mounted on a bottom side of frame of the bracket opposite of the heat sink.

* * * * *